United States Patent [19]
Wicks et al.

[11] Patent Number: 4,783,085
[45] Date of Patent: Nov. 8, 1988

[54] SEGMENTED RIGID SLIDING SEAL

[75] Inventors: David H. Wicks, Lake Park; Larry W. Gill, Palm Beach Gardens, both of Fla.

[73] Assignee: United Technologies Corporation, Hartford, Conn.

[21] Appl. No.: 30,795

[22] Filed: Mar. 27, 1987

[51] Int. Cl.4 ............................................. F16J 15/04
[52] U.S. Cl. ...................................... 277/12; 277/138; 277/192; 239/265.11
[58] Field of Search ................... 277/12, 32, 138, 192, 277/199, 237 R; 239/265.11, 265.37

[56] References Cited

U.S. PATENT DOCUMENTS

| | | | |
|---|---|---|---|
| 2,906,090 | 9/1959 | Morley et al. | 239/265.37 |
| 3,354,649 | 11/1967 | Madden . | |
| 3,892,358 | 7/1975 | Gisslen | 239/265.39 |
| 4,212,472 | 7/1980 | Mizuno et al. | 277/12 |
| 4,575,099 | 3/1986 | Nash | 277/12 |

Primary Examiner—Robert S. Ward
Attorney, Agent, or Firm—Troxell K. Snyder

[57] ABSTRACT

A seat assembly (10) with a plurality of individual segments (16, 18, 20). Each segment includes a rigid flapper (26) hinged at one end to one movable member (14) and slidably contacting a planar surface (12') in another member (12).

7 Claims, 2 Drawing Sheets

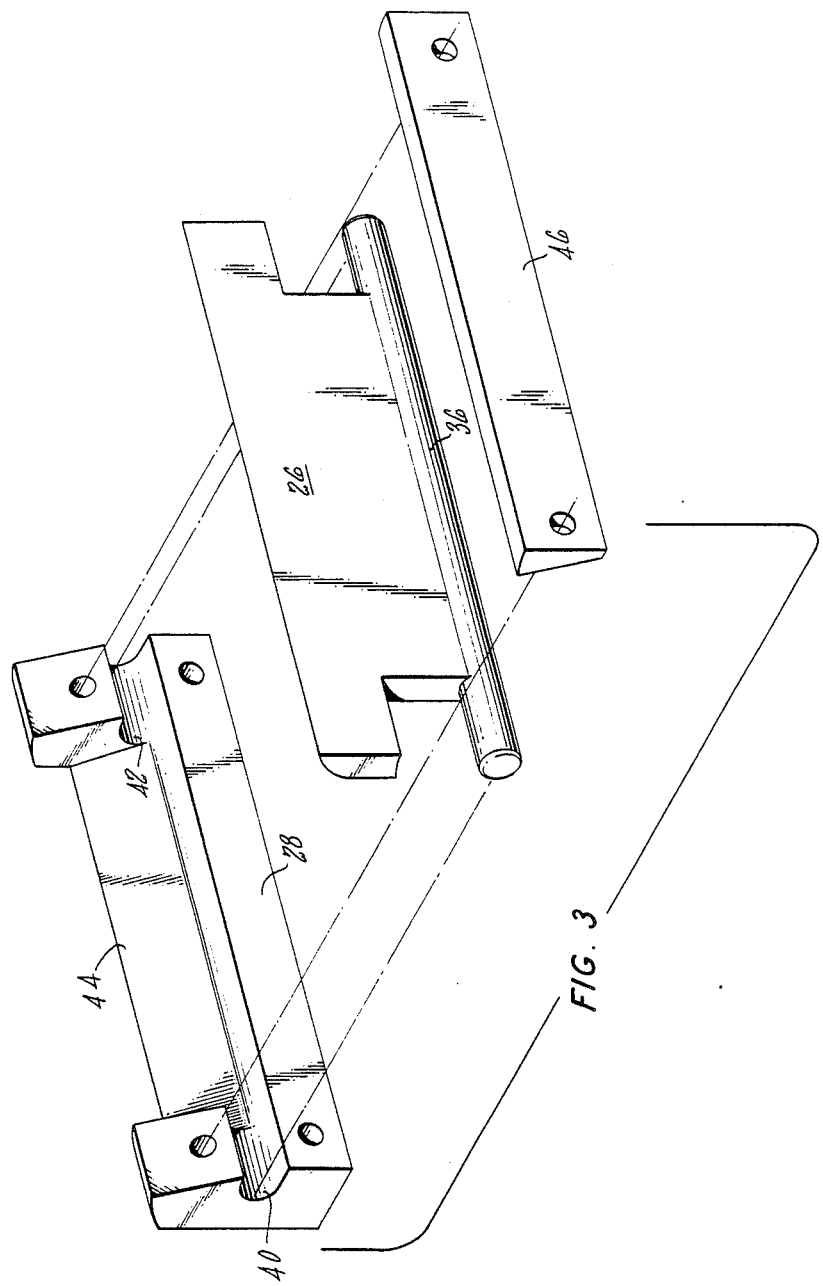

SEGMENTED RIGID SLIDING SEAL

This invention was made with Government support under a contract awarded by the Department of the Air Force. The Government has certain rights in this invention.

TECHNICAL FIELD

The present invention relates to a sliding seal between two relatively movable members.

BACKGROUND OF THE INVENTION

Sliding seal arrangements between relatively movable members are well known and are particularly useful in high performance gas turbine engine exhaust nozzles wherein one or more flaps move adjacent a stationary sidewall for directing the engine exhaust gases or varying the nozzle outlet area. Such sliding seals must not only resist the elevated pressure of the exhaust gases, up to 35 psig or higher, but also must resist temperatures which can reach over 4,000° F. (2,200° C.) for an engine and operating afterburner arrangement.

One complication in attempting to provide a sliding seal for members in such a nozzle arrangement is the occurrence of uneven warpage or other displacement between the nominally planar sidewall and the movable flap. Under the influence of uneven gas static pressure and temperature, sidewalls and flaps in modern lightweight nozzle arrangements can warp or flex unevenly over the length of the desired sealing line, requiring a seal assembly able to accommodate local variations in displacement between the members.

Prior art seals utilizing a continuous sealing element must be relatively flexible along the length of the seal assembly to allow the assembly to accommodate such differential displacement. Such flexibility is at odds with the requirement that the sealing element withstand the pressure loads and have little distortion due to exposure to high temperatures. These requirements typically indicate a thicker and hence a more inflexible sealing element is necessary. Prior art designs, for example U.S. Pat. No. 4,575,099 issued to Nash, have attempted to balance these needs through the use of a hinged, continuous sealing element. As with any continuous element, the ability to accommodate variation in the displacement between the members along the desired sealing line is related to the flexibility of the sealing element and attendant structure. What is required is a sliding seal assembly able to achieve the desired sliding seal with strong, relatively inflexible seal elements.

SUMMARY OF THE INVENTION

It is therefore an object of the present invention to provide a seal assembly disposed between a first planar member and a second member movable with respect thereto.

It is further an object of the present invention to provide a seal assembly for establishing a sliding seal line between the first second members.

It is further an object of the present invention to provide a seal assembly adapted to accommodate not only uniform differential displacement between the first and second members, but also anamalous local displacement such as may be due to thermal warpage or the like.

It is further an object of the present invention to provide a seal assembly which is both long wearing and adapted to be replaced in portions in response to local wear.

It is still further an object of the present invention to provide a seal assembly which is sealingly energized by the presence of an elongated gas static pressure in the volumetric region bounded by the sealing line.

According to the present invention a seal assembly for establishing a gas tight sliding seal between two relatively movable members is provided. The seal assembly is disposed along a sealing line defined between the members and a plurality of individual adjacent sealing segments.

Each segment comprises a pivotable flapper hinged at one end to one of the movable members and slidably contacting a planar surface on the other member at the other flapper end. The flappers of each segment are distinct and independently pivotable, thereby allowing each segment to respond to local variation in the spacing between the two members as may result from warpage, flexure, or other differential motion in the normal direction.

The flappers of the segments according to the present invention are rigid, allowing the use of a thicker flapper cross section and achieving a far higher wear life than thinner flexible seals of the prior art which must bend along the sealing line to accommodate such non-uniform displacement between the members. A spring, disposed adjacent the flapper in each segment, provides a biasing force for urging the flapper into contact with the planar surface.

By angling the flappers toward the higher pressure side of the sealing line, the seal assembly according to the present invention achieves a self-energizing arrangement which increases the contact and sealing forces between the flapper and planar surface responsive to increased gas static pressure. The segmented seals achieve effective local sealing despite non-uniform warpage between the first and second members by providing a plurality of independent flappers and segments, each being locally responsive to the displacement between the members and cooperating along the length of the sealing line to form an aggregate seal assembly and gas tight boundary.

The use of rigid flappers provides a distinct advantage over prior art, flexible seal elements by allowing the use of a thicker and hence longer wearing seal element. The thicker element or flapper is also structurally stronger than comparable functioning elements in the prior art seals, thereby reducing the likelihood of seal failure due to overpressure or overtemperature conditions.

Additionally, the segmented design of the seal assembly according to the present invention facilitates refurbishment of worn components by permitting repair and replacement of only those flappers and associated segment structure which have become worn or damaged. Unlike prior art continuous seals which must be replaced in toto, the individual elements of the seal assembly according to the present invention may be replaced as needed without disturbing adjacent seal segments. Both these and other objects and advantages of the seal assembly according to the present invention will be apparent to those skilled in the art upon review of the following specification and the appended claims and drawing figures.

BRIEF DESCRIPTION OF THE DRAWINGS

FIG. 3 shows an exploded view of a single seal segment according to the present invention.

DETAILED DESCRIPTION OF THE PREFERRED EMBODIMENT

Figure 1:
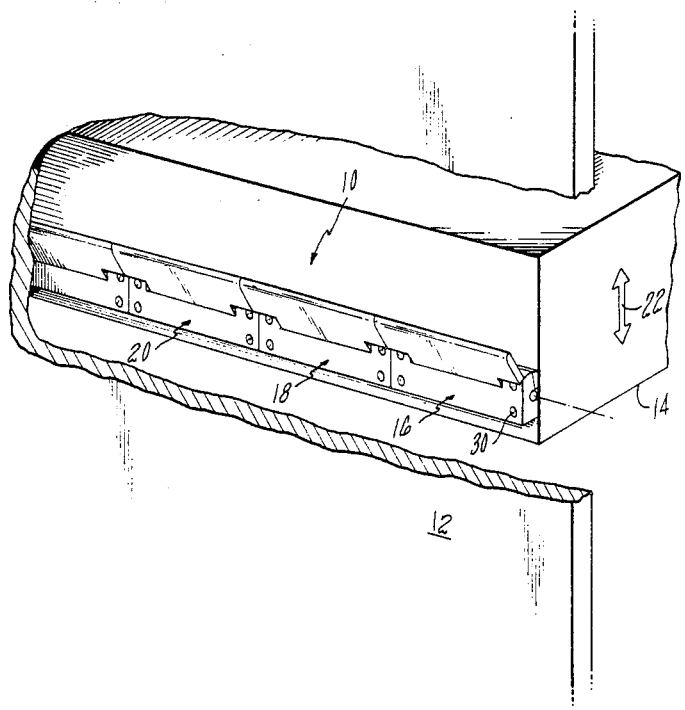
FIG. 1 shows a cut away isometric view of a seal assembly according to the present invention secured to a movable member.

FIG. 1 shows a seal assembly 10 according to the present invention disposed between a first member 12 having a generally planar surface and a second member 14 which is relatively movable 22 with respect to the first member 12. The seal assembly includes a plurality of individual segments 16, 18, 20, etc. which together form a sealing line for establishing a gas tight barrier between the first and second members 12, 14.

Such an arrangement may be found in an exhaust nozzle of a gas turbine engine wherein the second member 14 is a movable flap for redirecting the flow of the hot engine exhaust gas, and the first member 12 is a substantially static sidewall for defining the lateral boundaries of the exhaust gas nozzle passage. The seal assembly 10 in such a nozzle arrangement is required to prevent undesirable leakage between the members 12, 14 thereby avoiding nozzle loss and possible damage to temperature sensitive structures placed outside of the exhaust gas flow path.

As noted hereinabove, the surface of the member 12 contacted by the seal assembly 10, although substantially planar, frequently experiences a variety of non-uniform surface displacements as a result of the thermal effects of the high temperature exhaust gases or as a result of structural flexure due to the elevated exhaust gas static pressure. Such local variations in displacement between the first and second members 12, 14 are accommodated by the segmented construction of the seal assembly 10 according to the present invention.

Figure 2:
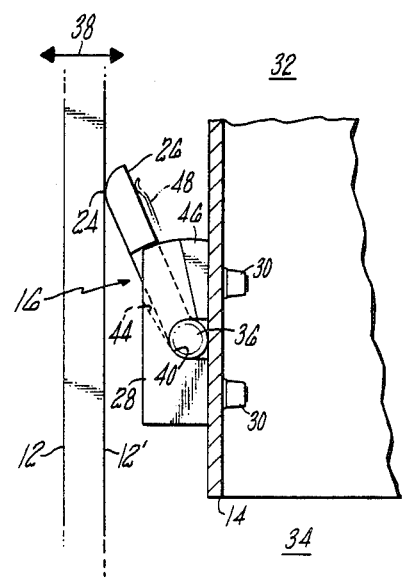
FIG. 2 shows a sectional view of an installed seal assembly according to the present invention taken in a plane locally normal to the sealing line.

The operation of a particular segment 16 of the seal assembly 10 according to the present invention is best explained with reference to FIG. 2. FIG. 2 shows a sectional view taken normal to the sealing line 24. Each seal segment 16 is shown secured to the second member 14 and includes a pivotable flapper 26 hinged at one end to a hinge block 28 secured by rivets 30 or other securing means to the second member 14. The other end of the flapper 26 slidably contacts the planar surface 12' of the first member 12 thereby establishing a sliding seal therebetween. The seal assembly defines a gas tight boundary between the nozzle interior 32 and the lower pressure nozzle exterior 34.

As shown in FIG. 3, the flapper 26 includes an elongated pin 36 at the one end which is received within the hinge block 28 for providing a pivotable connection therebetween. The flapper 26 is relatively thick as compared to prior art continuous seals, and is essentially inflexible under expected operating conditions and stresses. As will be appreciated from FIG. 2, local displacement 38 in the normal direction between the first and second members 12, 14 is locally accommodated by the corresponding seal segment 16 by the pivoting movement of the corresponding flapper 26. The segmented seal assembly 10 provides a plurality of independently pivotable flappers 26 wherein the pivoting of any one flapper 26 responsive to the local displacement 38 between the first and second members 12, 14 does not influence the operation of a second seal segment spaced apart therefrom. Thus, the segmented seal assembly 10 allows a rigid seal element or flapper 26 to achieve the same aggregate sealing function as the continuous seals of the prior art but without the materials and structural limitations necessary to provide longitudinal flexibility therein.

The rigid flappers 26 of the seal assembly 10 according to the present invention are not only thicker and hence inherently longer wearing than thin, flexible seal elements, but additionally provide the seal designer with an expanded range of available materials which are not adaptable to the prior art arrangements. Thus, a heat resistant material which is unable to accommodate repeated flexure and would hence be unsuitable for a prior art continuous seal arrangement can be incorporated into a rigid flapper 26 in the seal assembly 10 according to the present invention wherein the individual flappers do not deform to accommodate differential displacement between the members 12, 14.

The hinge block 28 of the seal segment according to the present invention is shown alone in FIG. 3. The hinge block 28 includes first and second slots 40, 42 for receiving the opposite ends of the hinge pin 36 of the flapper 26. It should be noted that the integral hinge pin 36 is but one structure for hingedly securing the flapper 26 to the second member 14, a result which may equivalently be accomplished by the use of alternating lugs (not shown) disposed in the flapper and block 26, 28 and a separate hinge pin (not shown) inserted therethrough.

Hinge block 28 also includes an integral stop 44 for limiting the pivoting motion of the hinged flap 26 away from the second member 14. The limiting stop 44 prevents overrotation of the flap 26 during any abnormal separation between the first and second members 12, 14. As the members 12, 14 return to normal displacement, the flapper 26 contacts the first member 12 at an angle, thus reestablishing the desired sliding contact therewith. A similar stop 46 is provided between the second member 14 and the flapper 26 for preventing "toggling over" of the flapper 26 thus ensuring that the flapper 26 is always within the desired operating range.

It is also within the scope of the present invention to provide a spring 48 or other urging means for biasing the flapper 26 relatively outward from the second member 14 and into sliding sealing contact with the planar surface 12' of the first member 12.

By angling the flapper 26 toward the higher pressure volume, for example volume 32 as shown in FIG. 2, the seal assembly 10 according to the present invention further provides an arrangement wherein the contact and sealing forces between the flapper 26 and the first member 12 are increased with increasing pressure across the seal assembly 10. The elevated gas static pressure in volume 32 urges the flapper 26 outward and more forcefully against the first member 12, thus providing an energizing force to each flapper 26 of each seal segment responsive to the gas static pressure differential across said segment 16. The arrangement thus provides a pressure feedback which assists the seal assembly 10 in resisting higher pressure forces within the contained volume 32.

Another feature of the seal assembly 10 according to the present invention results from the use of individual segments 16, 18, 20 wherein replacement or refurbishment of the seal assembly 10 need only include repair of those individual segments which have experienced undesirable wear, breakage, etc. This is particularly beneficial for first and second members wherein the local portions of the seal assembly 10 do not experience uniform environmental conditions and/or relative movement 22. For example, a pivotally movable second member 14 having a sealing line 24 extending from the flap pivot to an outer flap edge results in the segments disposed adjacent the outer flap edge slidably traversing far more distance during flap movement than similar segments disposed adjacent the flap pivot. The seal assembly 10 according to the present invention allows the faster-wearing outer seal segments, or individual components thereof, to be replaced as necessary without requiring replacement of the entire continuous sealing element as in prior art seal assemblies.

The seal assembly 10 according to the present invention achieves an aggregate seal along the desired sealing line 24 by providing a close fitting relationship between adjacent segments 16, 18 to reduce or eliminate leakage of gas or other material therebetween. The individual segments 16, 18, 20 may also be placed along a non-linear sealing line if desired, an arrangement which may be achieved by prior art continuous seal elements. In such a non-linear arrangement, the pivot axis of each individual segment 16 would be disposed locally parallel to the seal line 24, thus establishing a plurality of differential elements which in the aggregate form the non-linear seal assembly 10.

Finally, the length of each seal segment 16, 18, 20 along the desired sealing line 24 is defined responsive to the rate of local warpage or other varying displacement expected between the first and second members 12, 14. For one seal assembly 10 according to the present invention in a gas turbine engine vectoring exhaust nozzle having a movable flap 14 and an adjacent, static sidewall 12, the seal segment length along the desired sealing line was optimized at 3.625 inches (9.2 cm). The exact length chosen is a balance between the degree of local variation and the displacement between the two members 12, 14 and the increasing labor necessary to install and maintain a larger number of individual seal segments 16, 18, 20.

It should be noted that the seal assembly 10 as described hereinabove and illustrated in the appended figures is merely one of a number of possible equivalent embodiments of the present invention and should not therefore be interpreted as limiting the scope thereof in any way beyond those limitations specifically recited in the claims presented hereinbelow.

We claim:

1. A seal assembly disposed between a substantially planar surface in a first member and a second member movable substantially parallel thereto, comprising:
   a plurality of individual seal segments disposed along a desired sealing line, each segment including:
   a rigid flapper secured to the movable member and pivotable about a segment axis locally parallel to the desired sealing line, each flapper fitting closely at the axial edges thereof with the axially edges of the next adjacent flappers, and each flapper extending radially from the segment axis into sliding contact with the planar surface.

2. The seal assembly as recited in claim 1, wherein the axial length of each seal segment is established responsive to any expected local non-planar deflection of the surface.

3. The seal assembly as recited in claim 1, wherein each segment includes
   a hinge block having a pair of spaced apart slots for receiving and supporting an axially extending pin, and wherein
   each said axially extending pin is integral with the corresponding rigid flapper.

4. The seal assembly as recited in claim 3, wherein the hinge block includes an integral stop, disposed in the range of pivotable movement of the respective flapper, for limiting the range of movement thereof.

5. The seal assembly as recited in claim 1, further comprising
   means for biasing each flapper against the planar surface independent of any static gas pressure differential along the sealing line.

6. The seal assembly as recited in claim 5, wherein the biasing means includes
   a plurality of springs, located between each flapper and the movable member for urging each flapper toward the planar surface.

7. A seal assembly disposed between a substantially planar first member and a second member, the members being relatively movable in a plane parallel to the second member, comprising:
   a plurality of segments disposed along a desired sealing line, each segment closely fitting against each adjacent segment and further including
   an inflexible flapper, extending the length of the segment and pivotably secured to the second member at one end thereof, the pivot axis of each flapper being locally parallel to the desired sealing line, and
   the other end of each flapper slidingly in contact with the first, planar member.

* * * * *

UNITED STATES PATENT AND TRADEMARK OFFICE
CERTIFICATE OF CORRECTION

PATENT NO. : 4,783,085

DATED : November 8, 1988

INVENTOR(S) : David H. Wicks and Larry W. Gill

It is certified that error appears in the above-identified patent and that said Letters Patent is hereby corrected as shown below:

Title page:

In the Abstract, line 1, "seat" should be --seal--

In the Abstract, line 1, after "(10)" insert --is provided--

Col. 1, line 61, after "first" insert --and--

Col. 2, line 11, after "and" insert --includes--

Signed and Sealed this

Eighth Day of August, 1989

Attest:

DONALD J. QUIGG

*Attesting Officer*   *Commissioner of Patents and Trademarks*